United States Patent
Kim et al.

(10) Patent No.: US 10,242,249 B2
(45) Date of Patent: Mar. 26, 2019

(54) METHOD AND APPARATUS FOR EXTRACTING FACIAL FEATURE, AND METHOD AND APPARATUS FOR FACIAL RECOGNITION

(71) Applicant: Samsung Electronics Co., Ltd., Suwon-si, Gyeonggi-do (KR)

(72) Inventors: Namjoon Kim, Anyang-si (KR); Byungin Yoo, Seoul (KR); Changkyo Lee, Seoul (KR); Jaejoon Han, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 107 days.

(21) Appl. No.: 14/932,127

(22) Filed: Nov. 4, 2015

(65) Prior Publication Data

US 2016/0140383 A1   May 19, 2016

(30) Foreign Application Priority Data

Nov. 19, 2014 (KR) ........................ 10-2014-0161716

(51) Int. Cl.
  *G06K 9/00* (2006.01)
  *G06K 9/46* (2006.01)
  *G06K 9/62* (2006.01)

(52) U.S. Cl.
  CPC ..... *G06K 9/00234* (2013.01); *G06K 9/00281* (2013.01); *G06K 9/4652* (2013.01); *G06K 9/6207* (2013.01)

(58) Field of Classification Search
  CPC ............ G06K 9/00234; G06K 9/6207; G06K 9/4652; G06K 9/00281
  USPC ......................................................... 382/118
  See application file for complete search history.

(56) References Cited

U.S. PATENT DOCUMENTS

| 6,681,032 | B2 | 1/2004 | Bortolussi et al. |
| 7,130,454 | B1 | 10/2006 | Berube et al. |
| 8,655,029 | B2 | 2/2014 | Shiell et al. |
| 2007/0189627 | A1* | 8/2007 | Cohen ............... G06K 9/00228 382/254 |
| 2009/0185723 | A1* | 7/2009 | Kurtz ................ G06K 9/00288 382/118 |

(Continued)

FOREIGN PATENT DOCUMENTS

| JP | 2010271921 A | 12/2010 |
| JP | 2012181579 A | 9/2012 |

(Continued)

*Primary Examiner* — Andrew M Moyer
(74) *Attorney, Agent, or Firm* — Harness, Dickey & Pierce, P.L.C.

(57) ABSTRACT

A method and an apparatus for extracting a facial feature and a method and an apparatus for recognizing a face are provided, in which the apparatus for extracting a facial feature may extract facial landmarks from a current input image, sample a skin region and a facial component region based on the extracted facial landmarks, generate a probabilistic model associated with the sampled skin region and the facial component region, extract the facial component region from a face region included in the input image using the generated probabilistic model, and extract facial feature information from the extracted facial component region.

19 Claims, 26 Drawing Sheets

(56) References Cited

U.S. PATENT DOCUMENTS

| | | | | |
|---|---|---|---|---|
| 2013/0044958 A1* | 2/2013 | Brandt | ............... | G06K 9/00248 |
| | | | | 382/201 |
| 2013/0236052 A1 | 9/2013 | Corcoran et al. | | |
| 2015/0169166 A1* | 6/2015 | Kim | ...................... | G06F 3/0488 |
| | | | | 715/838 |

FOREIGN PATENT DOCUMENTS

| | | |
|---|---|---|
| JP | 2013073548 A | 4/2013 |
| KR | 100930994 B1 | 12/2009 |
| KR | 100988326 B1 | 10/2010 |
| KR | 20110044392 A | 4/2011 |
| KR | 20130121360 A | 11/2013 |

* cited by examiner

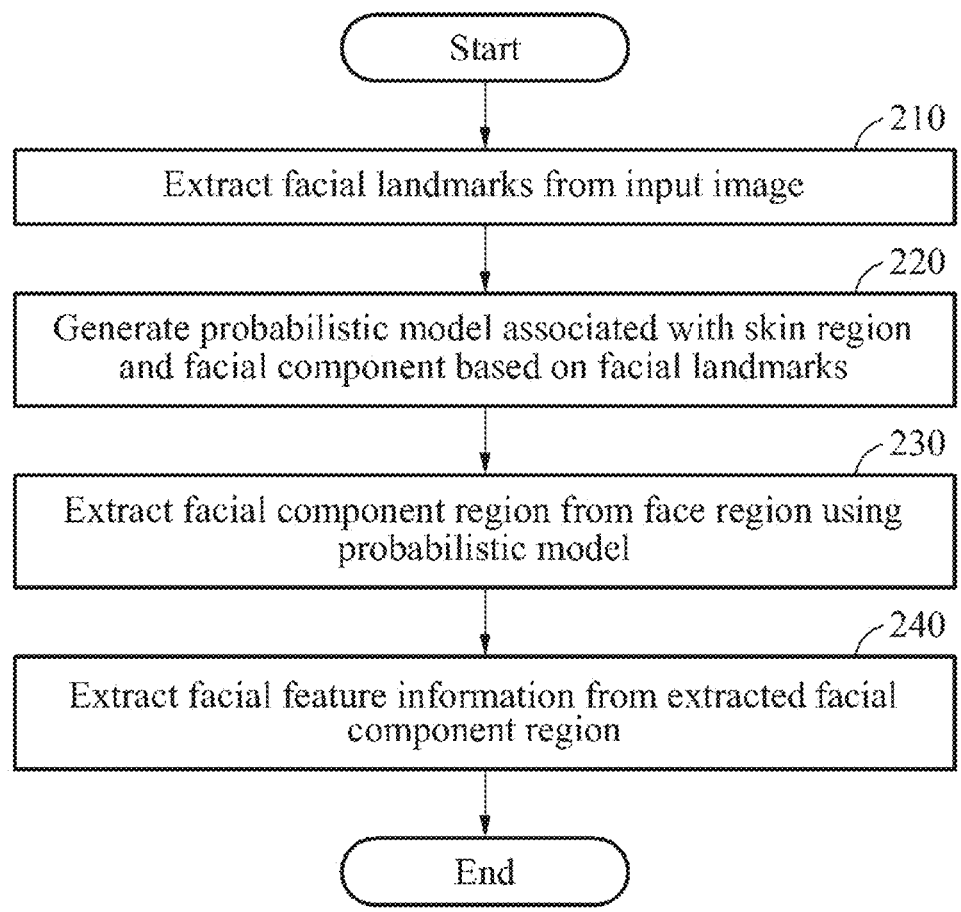

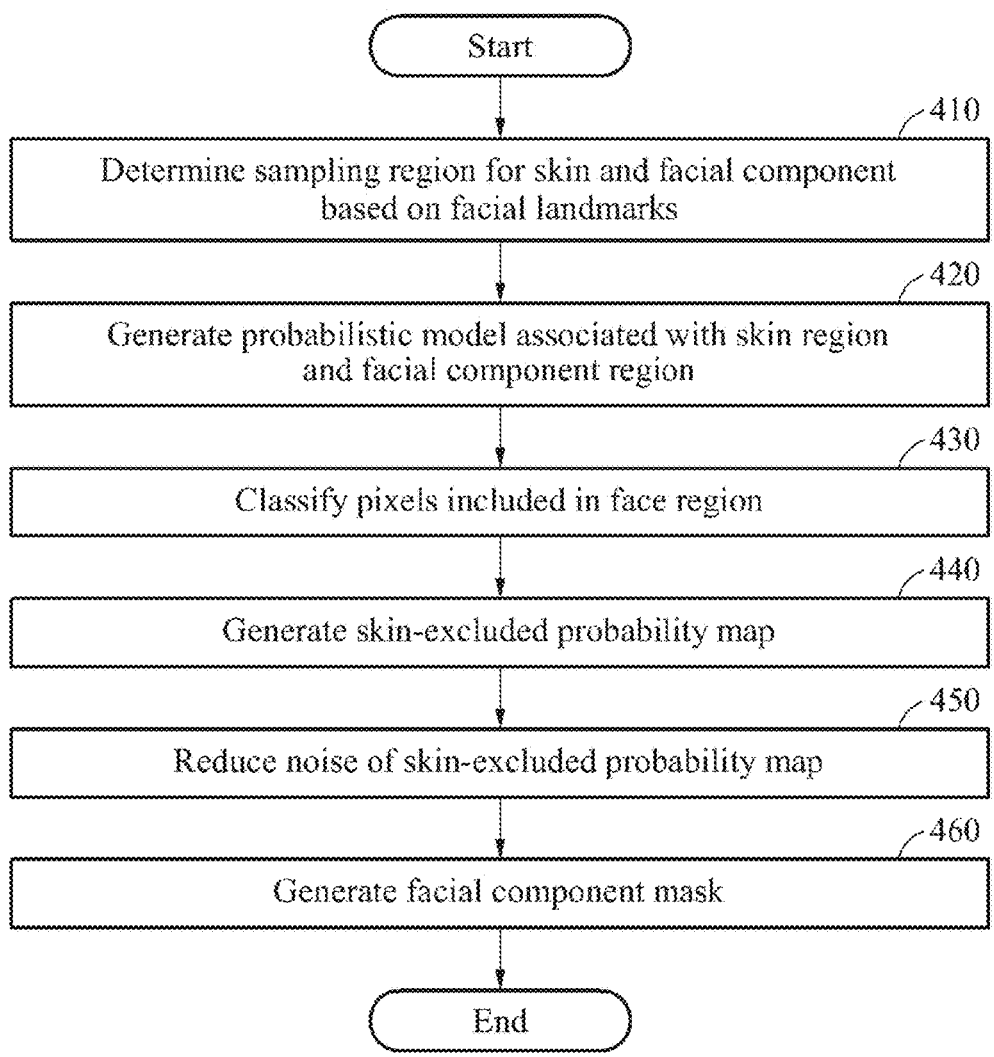

FIG. 9C

| Left eyebrow · eye 81D | Left eye 36D | Right eyebrow · eye 81D | Right eye 36D | Nose 64D | Upper lip 100D | Lower lip 100D |
|---|---|---|---|---|---|---|

METHOD AND APPARATUS FOR EXTRACTING FACIAL FEATURE, AND METHOD AND APPARATUS FOR FACIAL RECOGNITION

CROSS-REFERENCE TO RELATED APPLICATION

This application claims the priority benefit of Korean Patent Application No. 10-2014-0161716, filed on Nov. 19, 2014, in the Korean Intellectual Property Office, the entire contents of which are incorporated herein by reference in its entirety.

BACKGROUND

1. Field

At least some example embodiments relate to image processing technology to extract a facial feature from an image.

2. Description of the Related Art

Facial recognition technology may be simpler and less adverse to users in comparison to other biometric recognition technologies, for example, fingerprint and iris recognition. Such facial recognition technology has been widely used in various application fields, for example, identification, multimedia searches, security, and surveillance systems using facial information.

In general, a method of recognizing a face may include training a recognizer configured to perform facial recognition using learning images and performing the facial recognition on an input image using the trained recognizer. In an operation of training the recognizer, facial features may be extracted from the learning images and the recognizer may classify and learn the facial features. In an operation of performing the facial recognition, facial features may be extracted from an input image and the recognizer may perform the facial recognition based on the extracted facial features.

SUMMARY

At least some example embodiments relate to a method of extracting a facial feature.

In at least some example embodiments, the method may include extracting facial landmarks from an input image, the input image including a face region, generating a probabilistic model associated with a skin region based on the extracted facial landmarks, extracting a facial component region from the face region using the probabilistic model, and extracting facial feature information from the extracted facial component region.

The extracting the facial feature information may include determining a contour of a facial component based on the extracted facial component region, sampling a plurality of points on the contour of the facial component, determining multilevel contour point sets from the sampled points, and extracting the facial feature information based on each multilevel contour point set.

The extracting the facial component region may include classifying the face region into the skin region and the facial component region by applying pixel values of pixels in the face region to the probabilistic model, and generating one of a probability map and a facial component mask indicating the facial component region based on the classifying.

The extracting the facial feature information may include extracting a contour-level facial feature from the extracted facial component region using the generated at least one probability map and the facial component mask.

The generating the probabilistic model may include determining a sampling region for the skin region in the face region based on the facial landmarks, and generating the probabilistic model associated with the skin region by learning a likelihood associated with the skin region based on pixel values of pixels in the sampling region.

The generating the probabilistic model may include determining a sampling region for the facial component region in the face region based on the facial landmarks, and generating a probabilistic model associated with the facial component region by learning a likelihood associated with the facial component region based on pixel values of pixels in the sampling region.

The extracting the facial feature information may include extracting a chord angle feature from the facial component region by classifying an angle between points forming a shape of the facial component region as a multilevel.

The extracting the facial feature information may include identifying probability values of pixels in the extracted facial component region based on the probabilistic model, and extracting pixel-level information of the facial feature information based on the identified probability values of the pixels.

The extracting the facial feature information may include determining a polar shape matrix associated with the extracted facial component region by applying a polar model shape to the extracted facial component region.

At least other example embodiments relate to a method of recognizing a face.

In at least some example embodiments, the method may include extracting facial landmarks from an input image, the input image including a face region, generating a probabilistic model associated with a skin region and a facial component region based on the extracted facial landmarks, extracting facial feature information regarding the facial component region based on the probabilistic model, and recognizing a face in the input image based on the extracted facial feature information.

At least other example embodiments relate to an apparatus for extracting a facial feature.

In at least some example embodiments, the apparatus may include a landmark extractor configured to extract facial landmarks from an input image including a face region, a probabilistic model generator configured to generate a probabilistic model associated with a skin region and a facial component region based on the extracted facial landmarks, a facial component extractor configured to extract the facial component region from the face region using the probabilistic model, and a facial feature extractor configured to extract facial feature information from the extracted facial component region.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIG. 2 is a flowchart illustrating a method of extracting a facial feature according to at least one example embodiment;

FIG. 4 is a flowchart illustrating a procedure of extracting a facial component region from a face region using a probabilistic model according to at least one example embodiment;

FIGS. 9A through 9C and 10 illustrate a procedure of extracting a contour-level facial feature according to at least one example embodiment;

DETAILED DESCRIPTION

Figure 1:
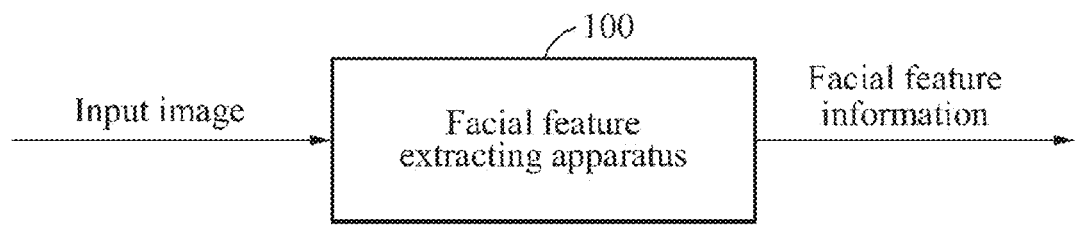
FIG. 1 is a diagram illustrating an overall operation of an apparatus for extracting a facial feature according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 is a diagram illustrating an overall operation of an apparatus for extracting a facial feature according to at least one example embodiment. Hereinafter, the apparatus for extracting a facial feature will be referred to as a facial feature extracting apparatus.

Referring to FIG. 1, a face image including a face region of a user may be input as an input image to a facial feature extracting apparatus 100. The input image may include a single face image or a plurality of face images, or include an overall or a partial face region of the user. The facial feature extracting apparatus 100 may extract facial feature information from the input image.

The facial feature information may refer to information regarding a facial feature extracted from the input image. The facial feature information may include information about a shape of a face of the user. For example, the facial feature information may include a feature descriptor of a contour or a region of a facial component appearing on the input image. The facial component may refer to a component playing an important role in characterizing the face of the user, for example, an eye, an eyebrow, a nose, a lip, and teeth.

In general, a mustache or beard region and a skin region may be a hindrance to extract a facial feature from the face region in the input image. For example, the skin region may decrease a characteristic degree of a facial component region, for example, an eye, a nose, and a lip, in the face region. Thus, extracting a correct facial component region without the skin region from the face region may be important for correct recognition of the face.

The facial feature extracting apparatus 100 may extract a detailed facial component region by applying a probabilistic model associated with the skin region to the input image, and extract the facial feature information from the extracted facial component region.

The facial feature extracting apparatus 100 may extract facial landmarks, for example, landmark points, of facial components from the input image, and generate a probabilistic model associated with the skin region and the facial component region based on the extracted landmarks. The facial feature extracting apparatus 100 may generate the probabilistic model through training on a likelihood associated with the skin region and facial component regions based on the extracted facial landmarks. The training on the likelihood, also interchangeably referred to as likelihood training herein, may indicate training on whether a pixel included in the face region belongs to the skin region or a facial component region based on pixel values of pixels included in the skin region and the facial component region based on facial landmarks of a current face region.

The facial feature extracting apparatus 100 may extract a facial component region from the face region in the input image using the generated probabilistic model. The facial feature extracting apparatus 100 may extract the facial feature information from the extracted facial component region. Through the operations described in the foregoing, the facial feature extracting apparatus 100 may extract the facial component region robust against an influence of an illumination or a skin color.

The facial feature extracting apparatus 100 may extract, from the extracted facial component region, a contour-level facial feature, a region-level facial feature, or a pixel-level facial feature. In an example, the facial feature extracting apparatus 100 may extract a chord angle feature robust against a rotation, a size, a movement, and a change in a shape by classifying, as a multilevel, an angle between points forming a shape of a facial component. In another example, the facial feature extracting apparatus 100 may extract the region-level facial feature from each facial component region using, for example, a polar model shape.

The facial feature extracting apparatus 100 may extract, from the input image, the region-level facial feature indicating shape contexts, for example, a skin-excluded probability map having elaborately separated facial component regions and a facial component mask. In addition, the facial feature extracting apparatus 100 may extract the pixel-level facial feature by applying, to the input image, an existing feature extracting method such as, for example, a local binary pattern (LBP), a scale invariant feature transform (SIFT), a histogram of oriented gradient (HoG), and a modified census transform (MCT).

For example, when an input image is a learning image for training a recognizer, facial feature information of the learning image that is extracted by the facial feature extracting apparatus 100 may be used for training the recognizer. For another example, when an input image is a target image for facial recognition, the facial recognition may be performed based on facial feature information of the target image that is extracted by the facial feature extracting apparatus 100.

FIG. 2 is a flowchart illustrating a method of extracting a facial feature according to at least one example embodiment.

Referring to FIG. 2, in operation 210, a facial feature extracting apparatus (e.g., apparatus 100) extracts facial landmarks from an input image including a face region. The facial landmarks may refer to feature points located on an eyebrow, an eye, a nose, a lip, a chin, an ear, or a facial contour.

The facial feature extracting apparatus may detect the face region in the input image, and extract facial landmarks of facial components from the detected face region. For example, the facial feature extracting apparatus may detect the face region in the input image using a Haar-based cascade Adaboost classifier that is widely used in a related technical field. The facial feature extracting apparatus may then extract the facial landmarks from the detected face region using an active contour model (ACM), an active shape model (ASM), an active appearance model (AAM), or a supervised descent method (SDM).

Alternatively, the facial feature extracting apparatus may perform a preprocessing operation such as, for example, background removal and luminance correction, on the input image, and extract the facial landmarks from the input image on which the preprocessing operation is performed.

In operation 220, the facial feature extracting apparatus generates a probabilistic model associated with a skin region and a facial component region based on the facial landmarks extracted in operation 210. The facial feature extracting apparatus may calculate a probability that each pixel included in the face region corresponds to the skin region or the facial component region. The probability that a pixel included in the face region corresponds to the skin region or the facial component region may be determined through the probabilistic model. A probability distribution calculated for each pixel may be indicated as a multivariate Gaussian probability density function (PDF).

The facial feature extracting apparatus may generate the probabilistic model by learning a likelihood model associated with color pixel values of the pixels included in the skin region and the facial component region based on location information of the facial landmarks.

In an example, the facial feature extracting apparatus may determine a sampling region for the skin region in the face region based on the facial landmarks, and generate a probabilistic model associated with the skin region by learning a likelihood associated with the skin region based on pixel values of pixels included in the determined sampling region. In addition, the facial feature extracting apparatus may determine a sampling region of the facial component region in the face region based on the facial landmarks, and generate a probabilistic model associated with the facial component region by learning a likelihood associated with the facial component region based on pixel values of pixels included in the determined sampling region.

A detailed operation of determining the sampling region by the facial feature extracting apparatus will be described with reference to FIGS. 7A through 7C.

In operation 230, the facial feature extracting apparatus extracts a more detailed facial component region from the entire face region using the probabilistic model associated with the skin region and the facial component region. The facial feature extracting apparatus may extract, from the input image, the detailed facial component region from which a background region and the skin region are excluded by using the probabilistic model associated with the skin region and the facial component region.

The facial feature extracting apparatus may extract, as the facial component region, a region having a low probability of a skin color from the face region using the probabilistic model. The facial feature extracting apparatus may classify the face region into the skin region and the facial component region by applying pixel values of pixels included in the face region to the probabilistic model. The facial feature extracting apparatus may generate a skin-excluded probability map or a facial component mask indicating the facial component region, based on a result of the classifying. The skin-excluded probability map may include probability information of each facial component extracted from the face region.

A detailed description of operations 220 and 230 will be provided with reference to FIG. 4.

In operation 240, the facial feature extracting apparatus extracts facial feature information from the facial component region extracted in operation 230. The facial feature extracting apparatus may extract, from the facial component region, a contour-level facial feature, a region-level facial feature, or a pixel-level facial feature.

The facial feature extracting apparatus may extract contour-level facial feature information from the facial component region using the skin-excluded probability map or the facial component mask. The facial feature extracting apparatus may identify each facial component region from the face region using the facial component mask associated with each facial component.

The facial feature extracting apparatus may extract a chord angle feature robust against a rotation, a size, a movement, and a change in a shape from the facial component region by classifying, as a multilevel, an angle between points forming a shape of a facial component.

The facial feature extracting apparatus may determine a contour of a facial component based on the facial component region, and sample a plurality of points on the contour of the facial component. The facial feature extracting apparatus may determine multilevel contour point sets from the sampled points. The facial feature extracting apparatus may extract the contour-level facial feature information such as, for example, a chord angle descriptor matrix, based on each contour point set. A detailed operation of extracting the chord angle descriptor matrix by the facial feature extracting apparatus will be described with reference to FIG. 5.

The facial feature extracting apparatus may extract region-level facial feature information or pixel-level facial feature information from the facial component region based on the skin-excluded probability map or facial component masks. The facial feature extracting apparatus may identify each facial component region from the face region using the skin-excluded probability map or each facial component mask.

The facial feature extracting apparatus may determine a feature extraction region associated with, for example, an eyebrow, an eye, and a lip, using the skin-excluded probability map or the facial component masks. The facial feature extracting apparatus may extract the region-level facial feature information regarding the determined feature extraction region using a polar model shape. The facial feature extracting apparatus may determine a polar shape matrix associated with the facial component region by applying a polar model shape to the facial component region. A detailed operation of extracting the polar shape matrix by the facial feature extracting apparatus will be described with reference to FIGS. 11A through 11C.

The facial feature extracting apparatus may extract the pixel-level facial feature information based on the probability information determined from the probabilistic model associated with the skin region and the facial component region. The facial feature extracting apparatus may identify probability values of the pixels included in the facial component region based on the probabilistic model, and extract the pixel-level facial feature information regarding the facial component region based on the identified probability values of the pixels.

For example, the facial feature extracting apparatus may extract an image feature through which a detailed change in a shape may be distinguished by applying an existing pixel-level feature extracting method such as, for example, an LBP, a SIFT, a HoG, and an MCT. The facial feature extracting apparatus may determine the feature extraction region associated with an eyebrow, an eye, and a lip from the input image using the skin-excluded probability map or the facial component masks, and extract the pixel-level facial feature information by applying the existing feature extracting method such as the LBP, the SIFT, the HoG, and the MCT to the probability values of the pixels included in the feature extraction region. The probability values of the pixels included in the feature extraction region may be determined based on the probability information determined from the probabilistic model.

A detailed description of operation 240 will be provided with reference to FIGS. 5 and 6A through 6D.

FIGS. 3A through 3D illustrate an operation of extracting a facial feature according to at least one example embodiment. The example operation may be sequentially performed as illustrated in FIGS. 3A through 3D.

Figure 3A:
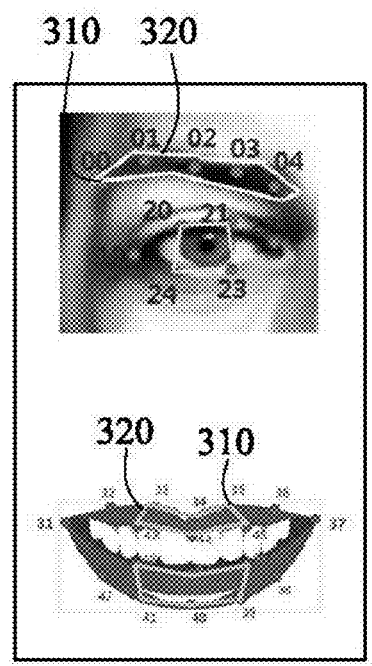
FIGS. 3A through 3D illustrate an operation of extracting a facial feature according to at least one example embodiment.

Referring to FIG. 3A, a facial feature extracting apparatus extracts facial landmarks 310 from an input image, and determines sampling regions 320 for training on a likelihood associated with a skin region and a facial component region.

Figure 3B:
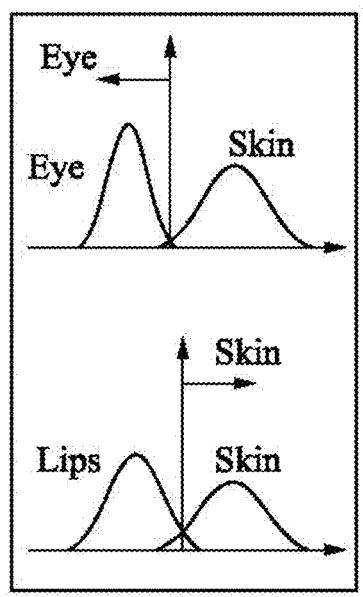

Referring to FIG. 3B, the facial feature extracting apparatus generates a probabilistic model associated with the skin region and the facial component region. The facial feature extracting apparatus may generate the probabilistic model associated with the skin region and the facial component region by learning the likelihood associated with the skin region and the facial component region based on pixel values of pixels included in each of the sampling regions 320.

Figure 3C:
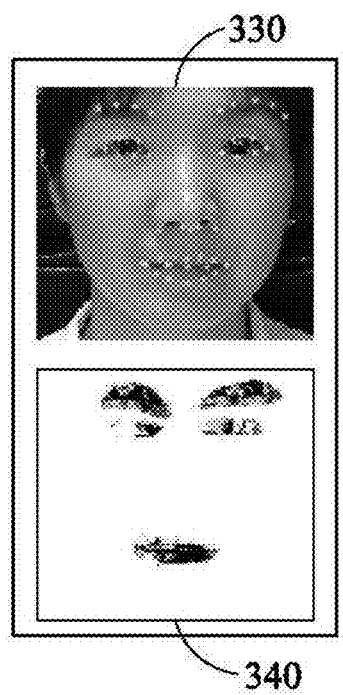

Referring to FIG. 3C, the facial feature extracting apparatus extracts, from an input image 330, a facial component region from which another region is excluded based on the probabilistic model. For example, an eyebrow region, an eye region, a nose region, and a lip region may be extracted from the input image 330. Such extracted facial component regions may be expressed in a form of a skin-excluded probability map 340 including probability information or a facial component mask.

Figure 3D:
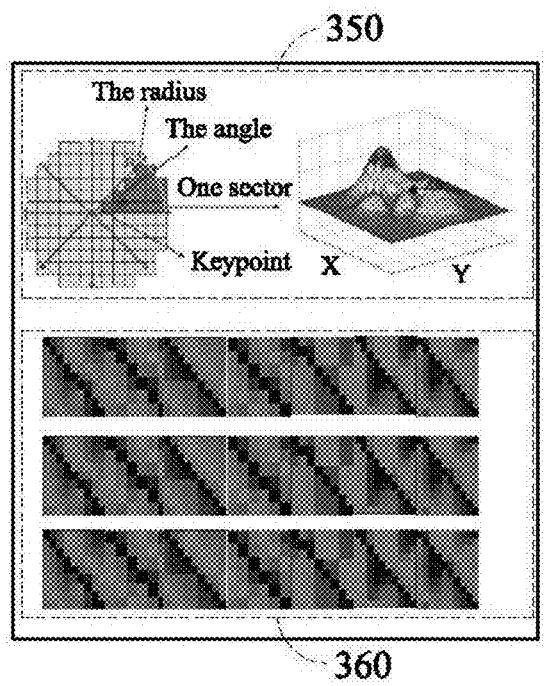

Referring to FIG. 3D, the facial feature extracting apparatus extracts facial feature information from the extracted facial component region. For example, the facial feature extracting apparatus may extract a region-level facial feature 350 or a contour-level facial feature 360 from the facial component region. In FIG. 3D, the region-level facial feature 350 may indicate a shape context feature, and the contour-level facial feature 360 may indicate a chord angle descriptor matrix associated with each facial component. In addition, the facial feature extracting apparatus may extract a facial feature through which a detailed change in a shape may be distinguished using an existing pixel-level feature extracting method, for example, an LBP, a SIFT, a HoG, and an MCT, from resulting images for each facial component region.

FIG. 4 is a flowchart illustrating a procedure of extracting a facial component region from a face region using a probabilistic model according to at least one example embodiment.

Referring to FIG. 4, in operation 410, a facial feature extracting apparatus determines a sampling region for a skin and a facial component based on facial landmarks. The facial feature extracting apparatus may determine a sampling region required for likelihood training in a face region based on facial landmarks of facial components. The facial feature extracting apparatus may determine a skin sampling region required for likelihood training associated with a skin region in the face region, and facial component sampling regions required for likelihood training associated with each facial component region. For example, the facial component sampling regions may include each sampling region associated with an eyebrow, an eye, a nose, and a lip.

The facial feature extracting apparatus may use an image clustering method such as, for example, simple linear iterative clustering (SLIC), to more accurately determine the sampling regions. The facial feature extracting apparatus may compare a mean value and a variance value of a cluster region including a predetermined and/or desired sampling region and an adjacent region of the sampling region to mean values and variance values of adjacent cluster regions using the image clustering method, and re-determine a sampling region required for the likelihood training based on a result of the comparing. For example, the facial feature extracting apparatus may re-determine, to be the sampling region, a region in which the mean value of the cluster region is higher than the adjacent cluster regions and the variance value of the cluster region is relatively lower than the adjacent cluster regions.

In operation 420, the facial feature extracting apparatus generates a probabilistic model associated with the skin region and the facial component region based on the sampling regions determined in operation 410. The facial feature extracting apparatus may generate a probabilistic model associated with the skin region and a probabilistic model associated with each facial component region. The probabilistic model may have a form of a PDF, and the facial feature extracting apparatus may determine a mean and a variance of the PDF.

The facial feature extracting apparatus may obtain a skin color probability distribution based on the skin sampling region. The facial feature extracting apparatus may obtain a multivariate Gaussian PDF associated with a skin color through likelihood training on a three channel, for example, red, green, and blue (RGB), skin color input. For example, the facial feature extracting apparatus may calculate the multivariate Gaussian PDF associated with the skin color based on Equation 1.

$$P_s\left(x_s \mid \mu_s, \sum_s\right) = \frac{1}{(2\pi)^{D/2}|\sum_s|^{1/2}} \exp\left(-\frac{1}{2}(x_s - \mu_s)^T \sum_s^{-1}(x_s - \mu_s)\right)$$ [Equation 1]

In Equation 1, "$P_s(\ )$" denotes a multivariate Gaussian PDF indicating a skin color distribution of a current input image. "xs" denotes a three-dimensional (3D) color vector value obtained in a skin sampling region. "$\mu_s$" and "$\Sigma_s$" denote a mean value and a covariance value of a 3D color input vector associated with the skin sampling region, respectively. Here, "D" denotes a magnitude of a dimension, a number of components per pixel in a color space may be three, and "s" relates to a skin region.

The facial feature extracting apparatus may obtain a facial component color probability distribution associated with each facial component based on the facial component sampling region. The facial feature extracting apparatus may obtain a multivariate Gaussian PDF associated with each facial component color through likelihood training on a three channel facial component color input, for example, RGB, included in each facial component sampling region. For example, the facial feature extracting apparatus may calculate a multivariate Gaussian PDF associated with each facial component color based on Equation 2.

$$P_c\left(x_c \mid \mu_c, \sum_c\right) = \frac{1}{(2\pi)^{D/2}|\sum_c|^{1/2}} \exp\left(-\frac{1}{2}(x_c - \mu_c)^T \sum_c^{-1}(x_c - \mu_c)\right)$$ [Equation 2]

In Equation 2, "$P_c(\ )$" denotes a multivariate Gaussian PDF indicating each facial component color distribution of a current input image. "$x_c$" denotes a 3D color vector value obtained in a facial component sampling region. "$\mu_c$" and "$\Sigma_c$" denote a mean value and a covariance value of a 3D color input vector associated with each facial component sampling region, respectively. Here, "D" denotes a magnitude of a dimension, a number of components per pixel in a color space may be three, and "c" relates to a facial component.

The facial feature extracting apparatus may determine the probabilistic model associated with the skin region and the probabilistic model associated with each facial component based on the multivariate Gaussian PDFs determined based on Equations 1 and 2.

In operation 430, the facial feature extracting apparatus classifies pixels included in the face region using the probabilistic model generated in operation 420. A facial component region may be extracted from the face region based on a result of the classifying of the pixels. The facial feature extracting apparatus may determine whether each pixel included in the face region belongs to the skin region or the facial component region based on the probabilistic model associated with the skin region and the probabilistic model associated with each facial component.

Alternatively, the facial feature extracting apparatus may determine an expanded pixel classification region to more accurately classify pixels, and classify the pixels based on pixel values of pixels included in the pixel classification region. A detailed operation of determining the expanded pixel classification region by the facial feature extracting apparatus will be described with reference to FIGS. 6A through 6D.

In operation 440, the facial feature extracting apparatus generates a skin-excluded probability map based on a result of the classifying performed in operation 430. The facial feature extracting apparatus may generate the skin-excluded probability map by comparing probability values associated with the skin region that are determined through the probabilistic model to probability values associated with each facial component that are determined through the probabilistic model. For example, the facial feature extracting apparatus may calculate a skin-excluded probability map associated with a facial component of an eye based on Equation 3.

$$P(\text{Eye} \mid x) > P(\text{Skin} \mid x) \Rightarrow$$ [Equation 3]
$$\frac{P(x \mid \text{Eye})P(\text{Eye})}{P(x)} > \frac{P(x \mid \text{Skin})P(\text{Skin})}{P(x)} \text{(Bayes's Rule)} \Rightarrow$$
$$P(x \mid \text{Eye}) > P(x \mid \text{Skin}), \text{ if } P(\text{Eye}) = P(\text{Skin})$$

In Equation 3, "P(Eye|x)" and "P(Skin|x)" denote a probability that a current pixel "x" is an eye region and a probability that the current pixel x is a skin region, respectively. A three channel, for example, RGB, color input value of the pixel x may be used to calculate the skin-excluded probability map.

For example, when a probability that a pixel is the eye region in a face region equals a probability that the pixel is the skin region in the face region, and Bayes's rule is used, the facial feature extracting apparatus may separate only a contour or a region of an eye by eliminating a pixel region having a skin color from the face region as in Equation 3 using respective PDFs obtained from a sampling region associated with the eye region and a sampling region associated with the skin region. In Equation 3, when only a region in which the probability that the pixel x is the facial component is higher than the probability that the pixel x is the skin region is extracted, the extracted region may become a corresponding region of the facial component and be indicated as the skin-excluded probability map.

In operation 450, the facial feature extracting apparatus reduces noise of the skin-excluded probability map. For example, the facial feature extracting apparatus may reduce the noise included in the skin-excluded probability map using a noise elimination method such as, for example, a Markov random field (MRF) and a graph cut, which are widely used in a related technical field.

In operation 460, the facial feature extracting apparatus generates a facial component mask based on the skin-excluded probability map from which the noise is reduced. The facial feature extracting apparatus may generate facial component masks for facial components. For example, the facial feature extracting apparatus may generate the facial component masks for the facial components by binarizing, to be 0 or 1, probability values in skin-excluded probability maps associated with the facial components having the probability values from 0 through 1.

Figure 5:
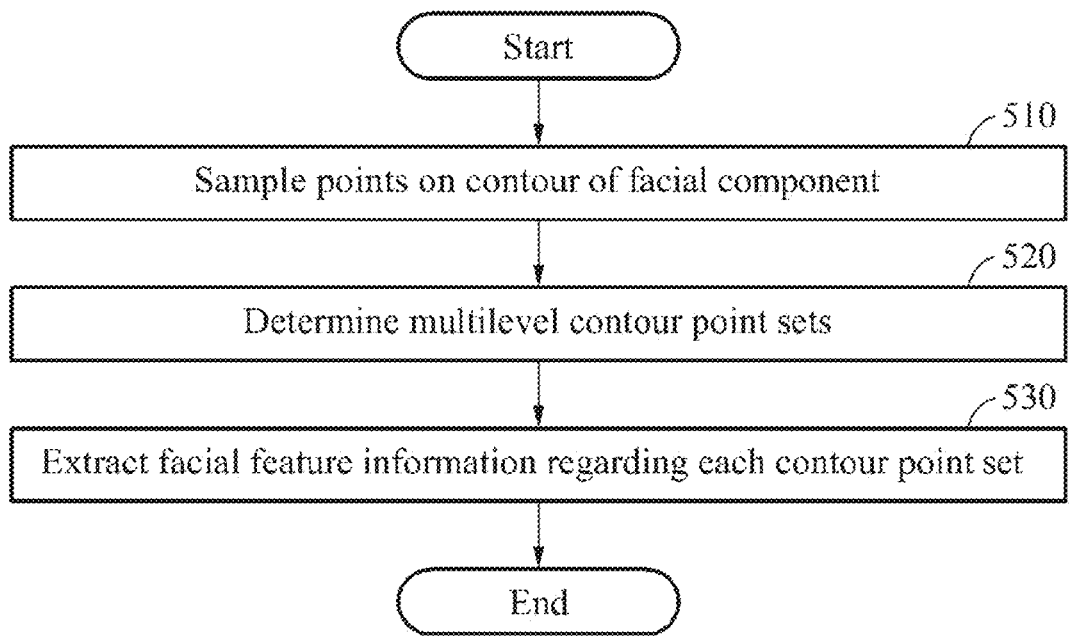
FIG. 5 is a flowchart illustrating a procedure of extracting a multilevel contour feature according to at least one example embodiment.

FIG. 5 is a flowchart illustrating a procedure of extracting a multilevel contour feature according to at least one example embodiment.

Referring to FIG. 5, in operation 510, a facial feature extracting apparatus samples a plurality of points on a contour of a facial component. The facial feature extracting apparatus may identify each facial component from a face region based on a facial component mask, and determine a closed contour of facial component regions. The facial feature extracting apparatus may sample the points at equidistant intervals on the closed contour of the facial component regions.

In operation 520, the facial feature extracting apparatus determines multilevel contour point sets from the points sampled on the contour of each facial component in operation 510. The facial feature extracting apparatus may determine the multilevel contour point sets from the sampled points on the contour of each facial component based on polygonal approximation. For example, the facial feature extracting apparatus may configure a contour point set based on a greater number of sampled points in an upper level, for example, a fine level, and configure a contour point set based on a smaller number of sampled points in a lower level, for example, a coarse level.

In operation 530, the facial feature extracting apparatus extracts facial feature information regarding each contour point set. For example, the facial feature extracting apparatus may extract a descriptor of a chord angle associated with each contour point set. The facial feature extracting apparatus may extract a feature associated with the chord angle by classifying an angle between the sampled points located on the contour of the facial component, and generate a chord angle descriptor matrix associated with the sampled points on the closed contour. The chord angle descriptor matrix on the contour of each facial component may be generated for each level contour point set. In an operation of recognizing a face, a chord angle descriptor matrix which is robust against a change in a facial expression may be selected from among a plurality of chord angle descriptor matrices.

FIGS. 6A through 6D illustrate an example of an operation of determining a pixel classification region according to at least one example embodiment. The example operation may be sequentially described as illustrated in FIGS. 6A through 6D. A facial feature extracting apparatus may determine a pixel classification region in a face region, and extract a detailed contour and a region of a facial component from the determined pixel classification region. The facial feature extracting apparatus may compare a PDF associated with a skin region to a PDF associated with a facial component region in the pixel classification region using a probabilistic model. Based on a result of the comparing, the facial feature extracting apparatus may extract a detailed facial component region from an input image by eliminating a pixel corresponding to the skin region among pixels included in the pixel classification region.

When the pixel classification region is sufficiently greater than a sampling region on which likelihood training is performed, the pixel classification region may include all facial component regions and thus, the detailed facial component region may be extracted from the pixel classification region.

Figure 6A:
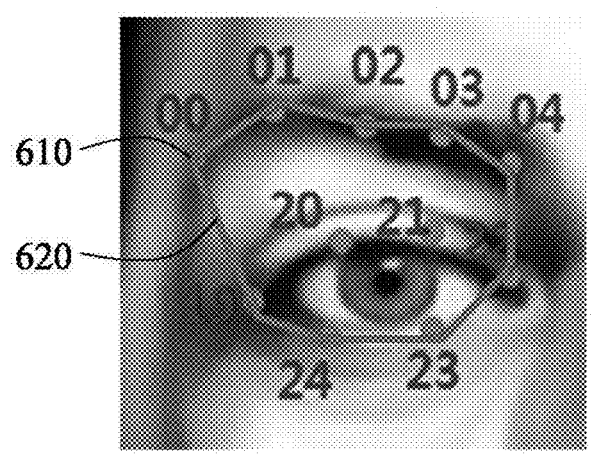
FIGS. 6A through 6D illustrate an operation of determining a pixel classification region according to at least one example embodiment.

Referring to FIG. 6A, the facial feature extracting apparatus may determine a closed contour 620 based on facial landmarks 610 of facial components. In FIG. 6A, the closed contour 620 includes an eyebrow and an eye. The facial feature extracting apparatus may determine an initial pixel classification region such as the closed contour 620 based on the facial landmarks 610.

Figure 6B:
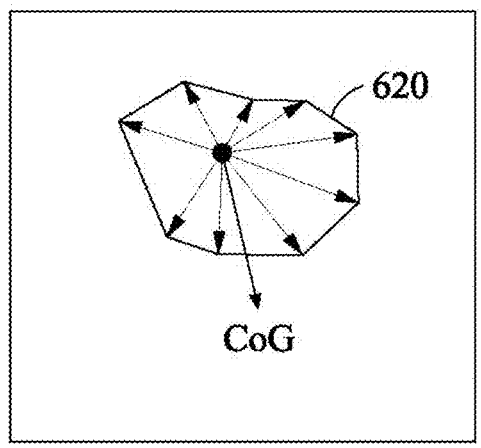
Figure 6C:
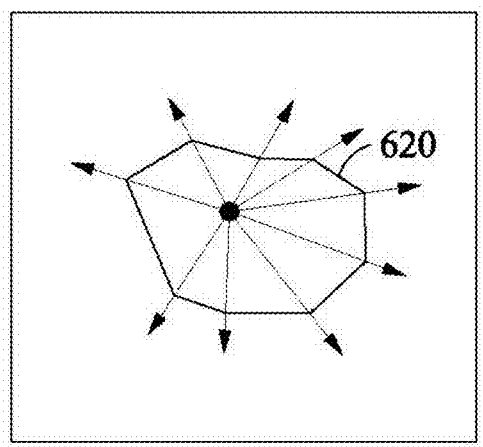
Figure 6D:
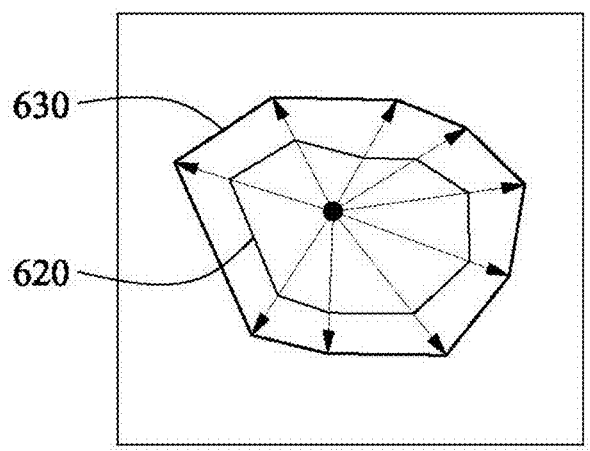

Referring to FIG. 6B, the facial feature extracting apparatus may calculate a center of gravity (CoG) of the closed contour 620. Referring to FIG. 6C, the facial feature extracting apparatus may calculate points located at each distance extended from the CoG to each sampling point of the closed contour 620. Referring to FIG. 6D, the facial feature extracting apparatus may determine a final pixel classification region 630 by connecting the calculated points.

Figure 7A:
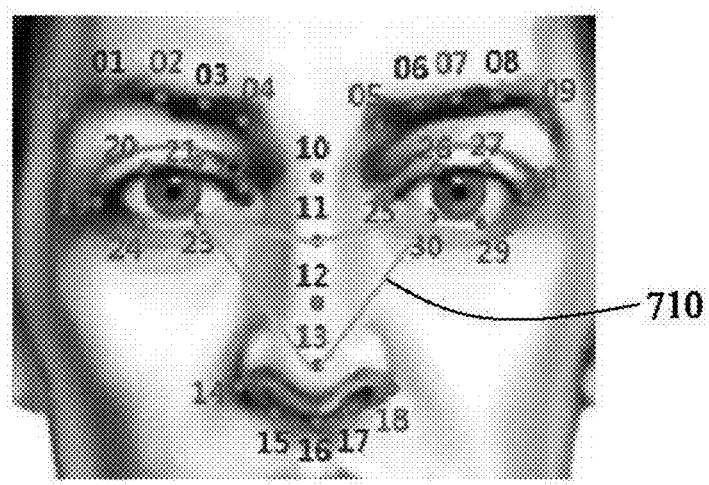
FIGS. 7A through 7C illustrate an operation of determining a sampling region for a skin region and a facial component region according to at least one example embodiment.
Figure 7B:
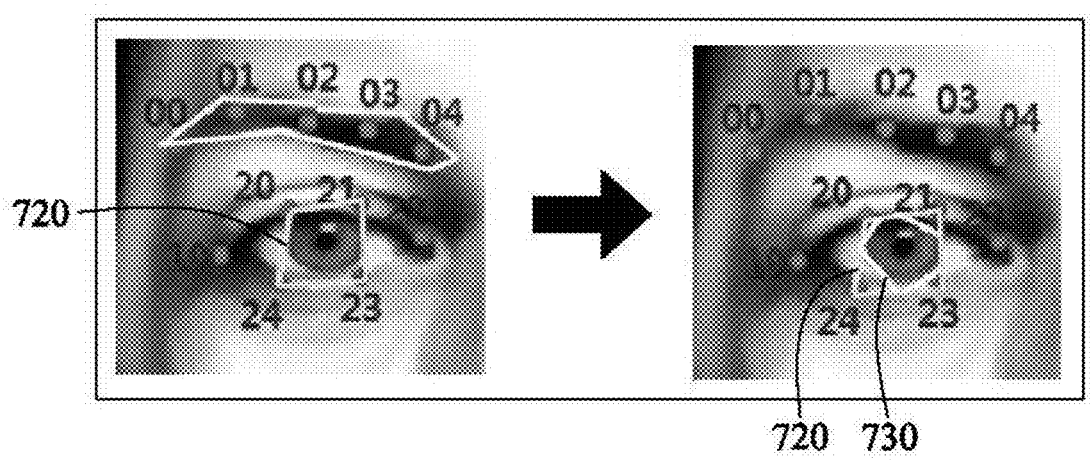
Figure 7C:
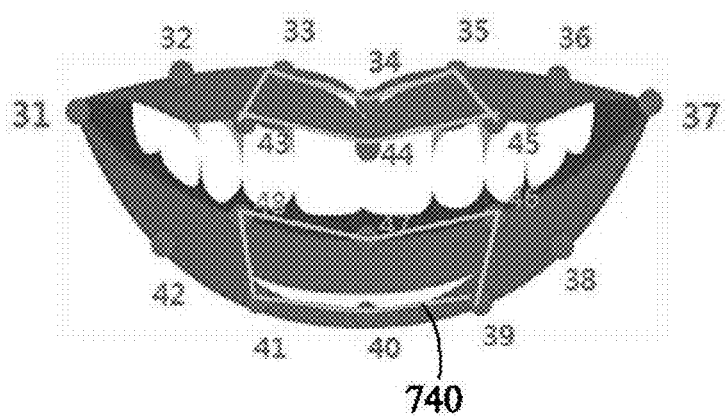

FIGS. 7A through 7C illustrate an operation of determining a sampling region for a skin region and a facial component region according to at least one example embodiment.

A facial feature extracting apparatus may determine sampling regions for a skin region and a facial component region based on facial landmarks extracted from an input image. The facial feature extracting apparatus may perform training based on pixel values of pixels included in a sampling region, and generate a probabilistic model associated with the skin region and the facial component region.

FIG. 7A illustrates a sampling region 710 for a skin region, which is determined based on facial landmarks. Referring to FIG. 7A, a nose region is included in the skin region because a color of the nose region is similar to a skin color. FIG. 7C illustrates a sampling region 740 for a lip region, which is determined based on facial landmarks extracted from the lip region. Here, a more accurate sampling region may be re-determined through an image clustering method. For example, as illustrated in FIG. 7B, the facial feature extracting apparatus may determine a sampling region 730, which is more accurate than a sampling region 720 predetermined and/or desired for an eye region, using the image clustering method. The sampling regions 710, 720, 730, and 740 illustrated in FIGS. 7A through 7C may include color pixels representing a skin color or a facial component region, which are relatively robust against illumination or occlusion in a face region.

Figure 8A:
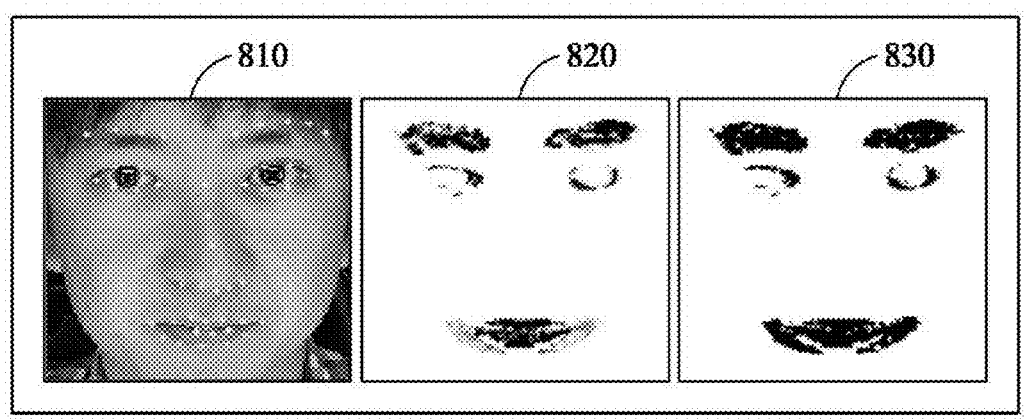
FIGS. 8A and 8B illustrate examples of a facial component region extracted from a face region according to at least one example embodiment.
Figure 8B:
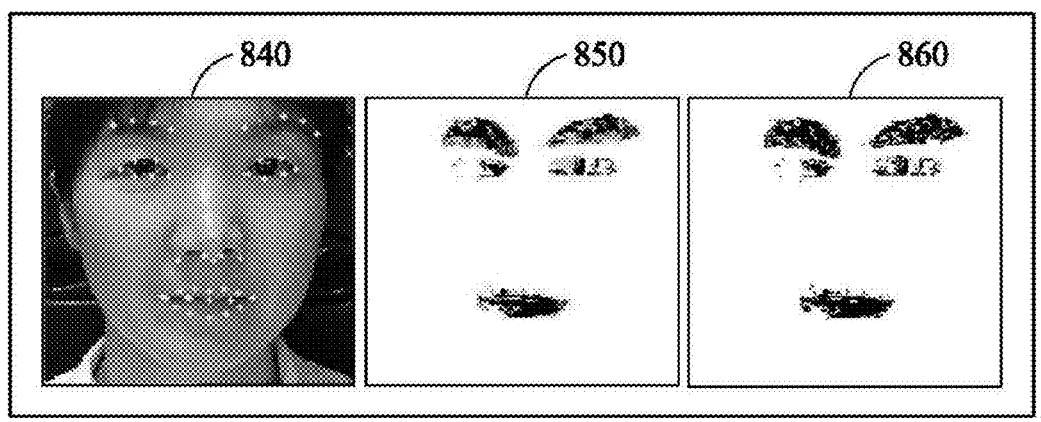

FIGS. 8A and 8B illustrate examples of a facial component region extracted from a face region according to at least one example embodiment. The facial component region extracted from the face region may be expressed in a form of a skin-excluded probability map or a facial component mask.

FIG. 8A illustrates a skin-excluded probability map 820 and a facial component mask 830 generated from an input image 810. FIG. 8B illustrates a skin-excluded probability map 850 and a facial component mask 860 generated from another input image 840. Referring to FIGS. 8A and 8B, the skin-excluded probability maps 820 and 850 may include probability value information regarding pixels included in a facial component region. The skin-excluded probability maps 820 and 850 may include the probability value information including 0 through 1, the facial component masks 830 and 860 may include probability value information including 0 or 1. For example, each of the facial component masks 830 and 860 may be generated by setting, to be 1, probability values of pixels having probability values greater than 0 in each of the skin-excluded probability maps 820 and 850.

FIGS. 9A through 9C and 10 illustrate a procedure of extracting a contour-level facial feature according to at least one example embodiment.

Figure 9A:
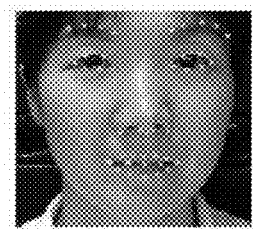
Figure 9B:
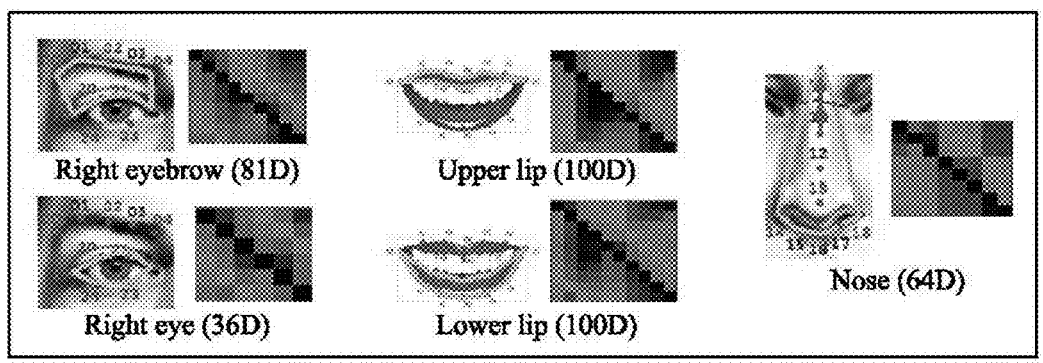

FIGS. 9A through 9C illustrate an operation of extracting a chord angle feature, which is one of contour-level facial features, from an input image. FIG. 9A illustrates the input image, FIG. 9B illustrates a chord angle descriptor matrix of each facial component, and FIG. 9C illustrates an example of combining and vectorizing chord angle descriptor matrices calculated for facial components.

Referring to FIGS. 9A through 9C, when an image is input, a facial feature extracting apparatus may determine a contour of each facial component, for example, a gap between an eye and an eyebrow, a nose, an upper lip, and a lower lip, and determine multilevel contour point sets based on polygonal approximation using points sampled on the contour. The facial feature extracting apparatus may then calculate chord angle descriptor matrices for the contour point sets.

For example, the chord angle descriptor matrices calculated for the facial components as illustrated in FIG. 9C may be integrated into multilevel vectors to be used as facial feature information to be used for facial recognition. In FIG. 9C, "D" indicates a dimension. In an operation of the facial recognition, not all the chord angle descriptor matrices may be used, since only selected chord angle descriptor matrices of certain facial components may be used or a combination of chord angle descriptor matrices may be used as a contour-level facial feature.

Figure 10:
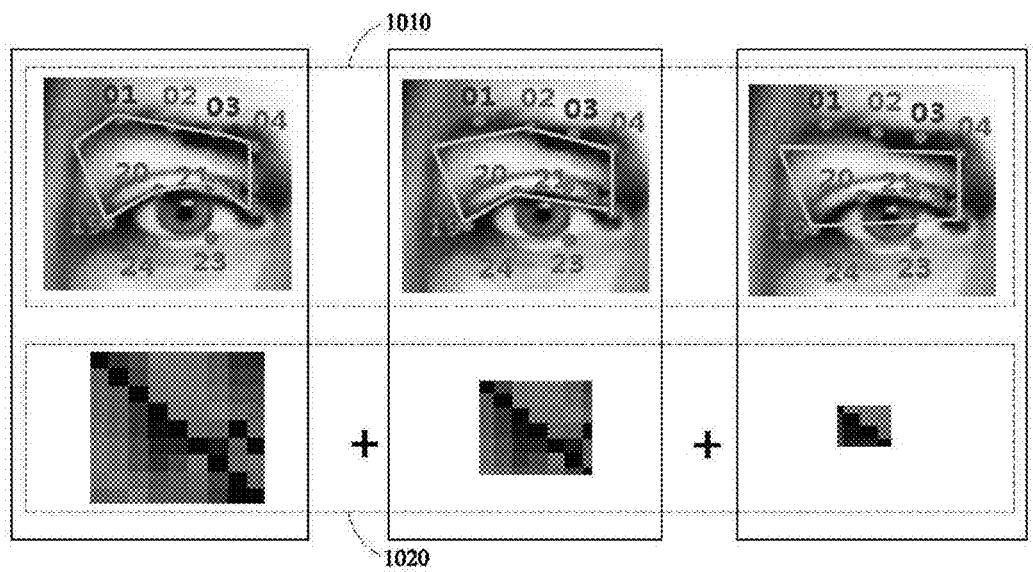

FIG. 10 illustrates an operation of extracting a multilevel chord angle feature based on polygonal approximation. A facial feature extracting apparatus may determine multilevel contour point sets from points sampled on a contour of a facial component. A leftmost box of FIG. 10 illustrates an example of an uppermost level at which more accurate contour point sets are determined. A center box of FIG. 10 illustrates an example of contour point sets determined at a middle level, and a rightmost box of FIG. 10 illustrates an example of contour point sets determined at a lowest level. A number of sampled points included in a contour point set may decrease as a level becomes lower.

Referring to FIG. 10, an index 1010 indicates a change in the contour point sets based on the level, and an index 1020 indicates a chord angle descriptor matrix calculated for each contour point set. The facial feature extracting apparatus may generate chord angle descriptor matrices for the contour point sets at each level, and store all the chord angle descriptor matrices based on the level.

Figure 11A:
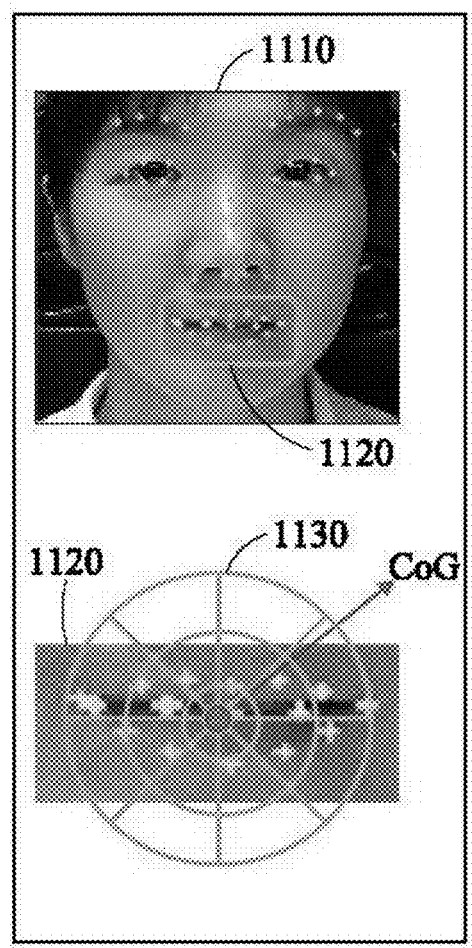
FIGS. 11A through 11C illustrate a procedure of extracting a region-level facial feature according to at least one example embodiment.
Figure 11B:
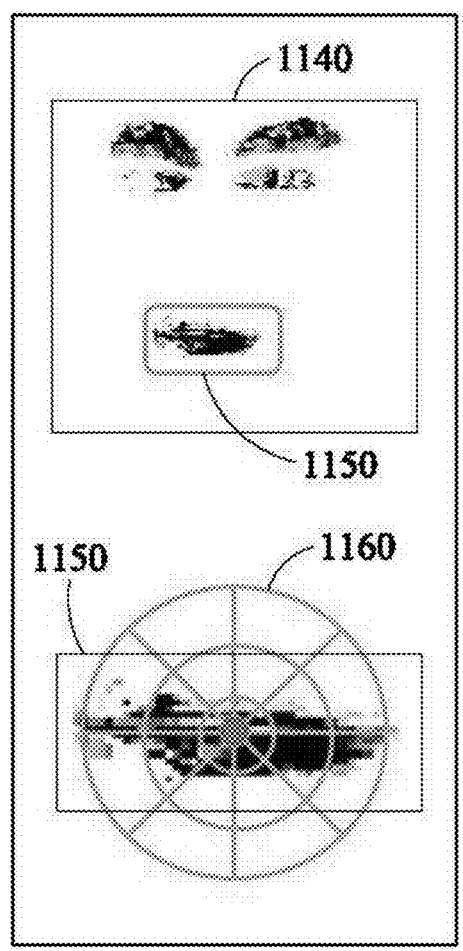
Figure 11C:
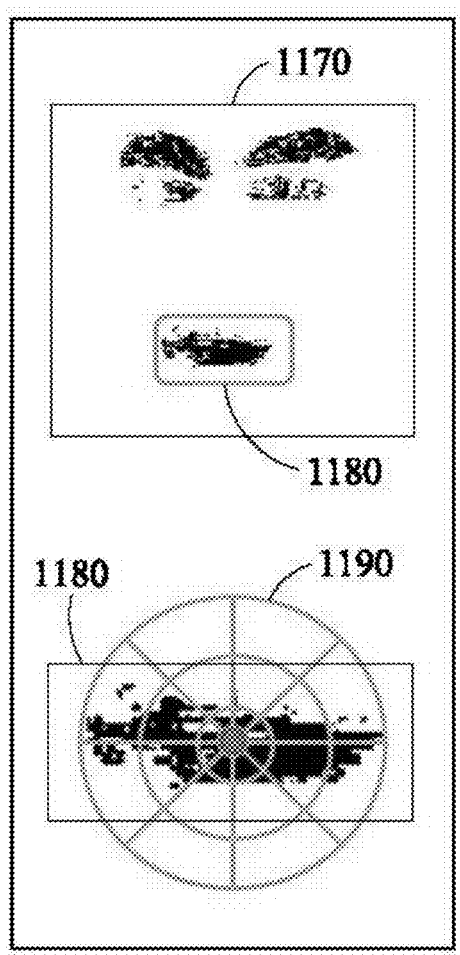

FIGS. 11A through 11C illustrate a procedure of extracting a region-level facial feature according to at least one example embodiment. A facial feature extracting apparatus may extract a region-level facial feature from each facial component region through a polar model shape and polar shape matrices. The facial feature extracting apparatus may calculate a CoG of each facial component region, and determine the polar shape matrices by applying the polar model shape to each facial component region based on the CoG.

FIGS. 11A through 11C illustrate an operation of determining a polar shape matrix associated with a lip region. Referring to FIG. 11A, from an input image 1110, the facial feature extracting apparatus may calculate a CoG of the lip region in an adjacent region 1120 including the lip region, and determine a polar shape matrix by applying a polar model shape 1130 based on the CoG to the lip region. Here, components of the polar shape matrix associated with the input image 1110 may be determined based on a color vector value of a pixel.

Referring to FIG. 11B, from a skin-excluded probability map 1140, the facial feature extracting apparatus may calculate a CoG of a lip region in an adjacent region 1150 including the lip region, and determine a polar shape matrix by applying a polar model shape 1160 based on the CoG to the lip region. Here, components of the polar shape matrix associated with the skin-excluded probability map 1140 may be determined based on a probability value including 0 through 1.

Referring to FIG. 11C, from a facial component mask 1170, the facial feature extracting apparatus may calculate a CoG of a lip region in an adjacent region 1180 including the lip region, and determine a polar shape matrix by applying a polar model shape 1190 based on the CoG to the lip region. Here, components of the polar shape matrix associated with the facial component mask 1170 may be determined based on a probability value including 0 or 1.

Figure 12:
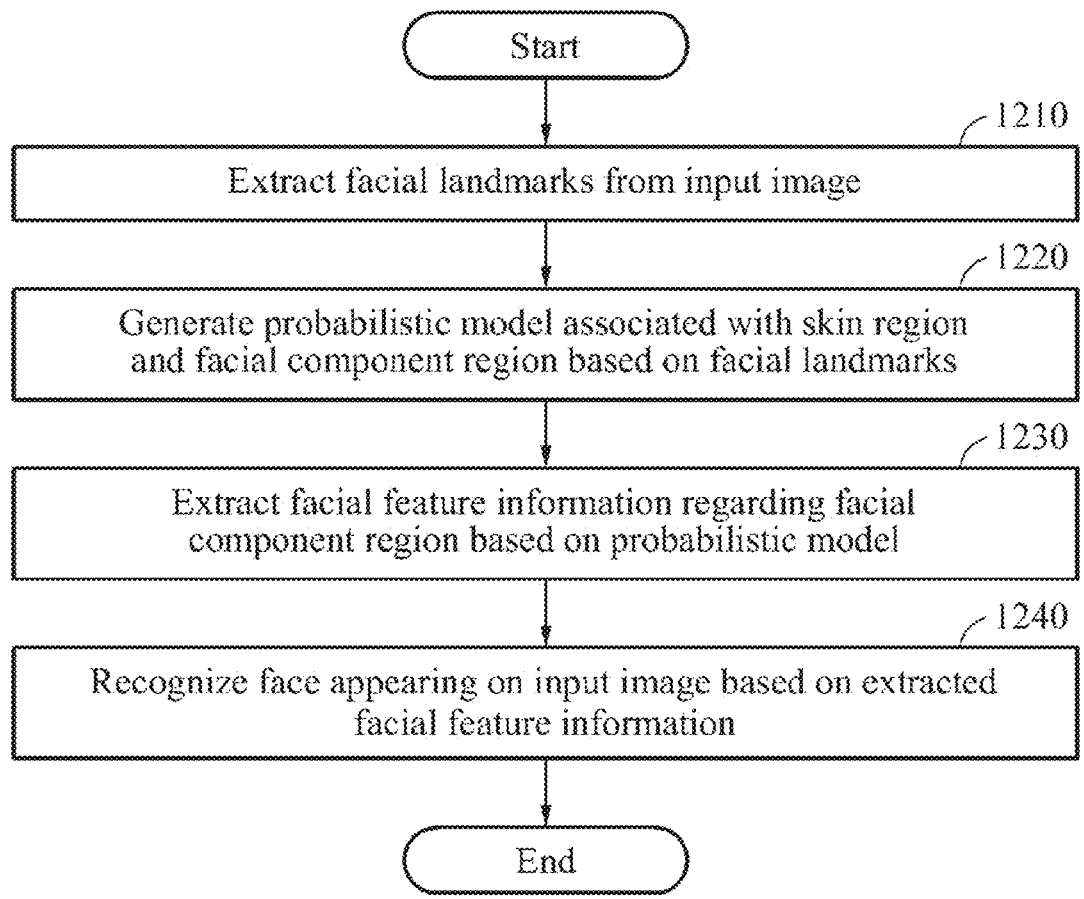
FIG. 12 is a flowchart illustrating a method of recognizing a face according to at least one example embodiment.

FIG. 12 is a flowchart illustrating a method of recognizing a face according to at least one example embodiment.

Referring to FIG. 12, in operation 1210, an apparatus for recognizing a face, hereinafter also referred to as a facial recognition apparatus (e.g., the apparatus 100), extracts facial landmarks from an input image for facial recognition. The facial recognition apparatus may detect a face region in the input image including the face region, and extract facial landmarks of facial components from the detected face region. For example, the facial recognition apparatus may detect the face region from the input image using a Haar-based cascade Adaboost classifier. The facial recognition apparatus may then extract the facial landmarks from the detected face region using an ACM, an ASM, an AAM, or an SDM.

For another example, the facial recognition apparatus may first perform a preprocessing operation such as, for example, background removal and luminance correction, on the input image, and extract the facial landmarks from the input image on which the preprocessing operation is performed.

In operation 1220, the facial recognition apparatus generates a probabilistic model associated with a skin region and a facial component region based on the facial landmarks extracted in operation 1210. The facial recognition apparatus may calculate a probability that each pixel included in the face region belongs to the skin region or the facial component region. The facial recognition apparatus may generate the probabilistic model through training on a likelihood model based on color pixel values of pixels included in the skin region and the facial component region based on location information of the facial landmarks. Through the probabilistic model, a probability that a pixel included in the face region corresponds to the skin region or the facial component region may be determined.

In an example, the facial recognition apparatus may determine a sampling region in the face region based on the facial landmarks, and generate probabilistic models associated with the skin region and facial component regions based on pixel values of pixels included in the determined sampling region.

In operation 1230, the facial recognition apparatus extracts facial feature information regarding the facial component region based on the probabilistic model generated in operation 1220.

For example, the facial recognition apparatus may extract a facial component region from a face region using a probabilistic model learned based on a facial landmark in a current input image. The facial recognition apparatus may extract, as the facial component region, a region having a low probability of corresponding to a skin tone from the face region using the probabilistic model. The facial recognition apparatus may classify the face region into the skin region and the facial component region by applying pixel values of pixels included in the face region to the probabilistic model. The facial recognition apparatus may generate a skin-excluded probability map or a facial component mask indicating the facial component region, based on a result of the classifying.

The facial recognition apparatus may extract, from the extracted facial component region, contour-level facial feature information, region-level facial feature information, or pixel-level facial feature information.

In an example, the facial recognition apparatus may determine a contour of a facial component based on the facial component region, and sample a plurality of points on the determined contour of the facial component. The facial recognition apparatus may determine multilevel contour point sets from the sampled points, and extract the contour-level facial feature information such as a chord angle descriptor matrix based on each contour point set.

In another example, the facial recognition apparatus may determine a feature extraction region associated with, for example, an eyebrow, an eye, and a lip, using a skin-excluded probability map or facial component masks. The facial recognition apparatus may extract the region-level facial feature information using a polar model shape for the determined feature extraction region. The facial recognition apparatus may determine a polar shape matrix associated with the facial component region by applying the polar model shape to the facial component region.

In still another example, the facial recognition apparatus may extract an image feature through which a detailed change in a shape may be distinguished by applying an existing pixel-level feature extracting method such as, for example, an LBP, a SIFT, a HoG, and an MCT, to a probability value determined through the probabilistic model. The facial recognition apparatus may determine the feature extraction region associated with the eyebrow, the eye, and the lip from the input image using the skin-excluded probability map or the facial component masks, and extract the facial feature information by applying the feature extracting method such as the LBP, the SIFT, the HoG, and the MCT to probability values of the skin-excluded probability map corresponding to the determined feature extraction region.

A procedure of extracting the facial feature information from the input image by the facial recognition apparatus through operations 1210 through 1230 may correspond to the procedure of extracting the facial feature information from the input image by the facial feature extracting apparatus described with reference to FIGS. 1 through 11.

In operation 1240, the facial recognition apparatus recognizes a face appearing on the input image based on the facial feature information extracted in operation 1230. The facial recognition apparatus may compare the facial feature information extracted from the input image to reference facial feature information prestored in a database, and calculate a level of similarity between the facial feature information extracted from the input image and the reference facial feature information. For example, the facial recognition apparatus may calculate the level of similarity between the facial feature information extracted from the input image and the reference facial feature information using a method widely used in a related technical field, for example, a principal component analysis (PCA) and a linear discriminant analysis (LDA).

When the level of similarity between the facial feature information extracted from the input image and the reference facial feature information satisfies a predetermined and/or desired condition, the facial recognition apparatus may determine the facial recognition a success. Alternatively, the facial recognition apparatus may determine the facial recognition a failure. Such a result of the facial recognition may be provided to a user through a display or an audio system.

Figure 13:
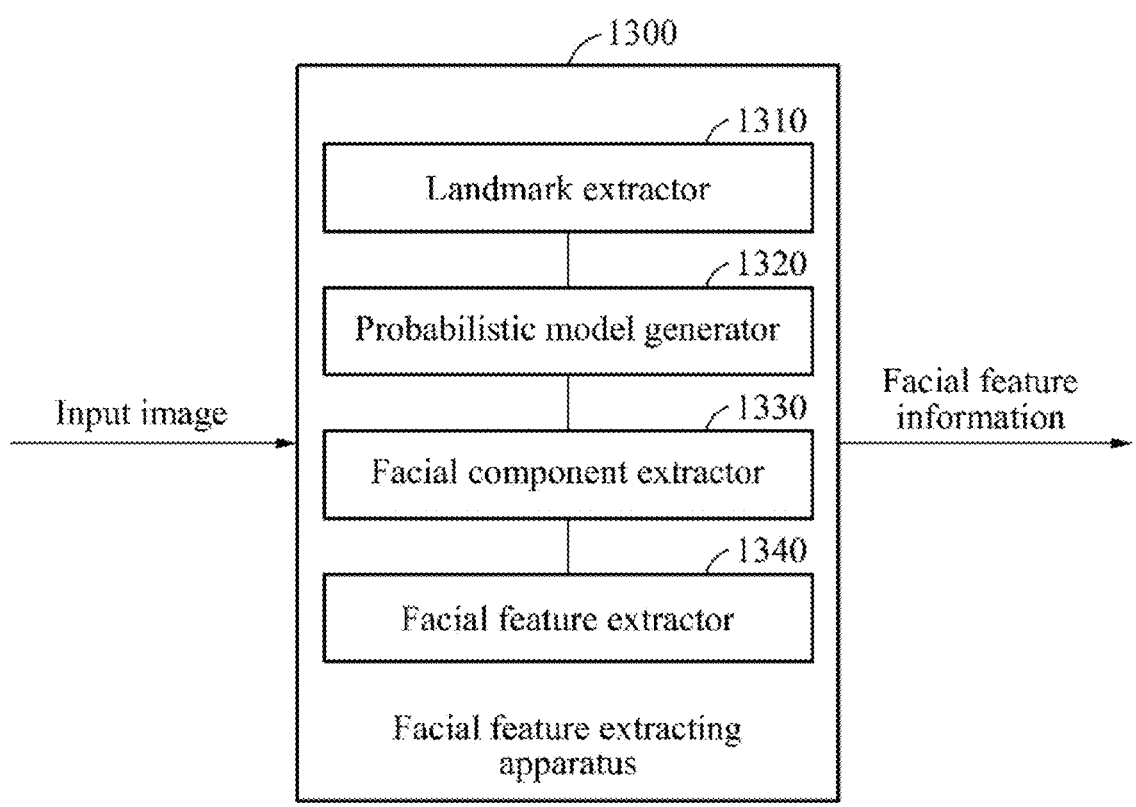
FIG. 13 is a diagram illustrating an apparatus for extracting a facial feature according to at least one example embodiment.

FIG. 13 is a diagram illustrating a facial feature extracting apparatus 1300 according to at least one example embodiment.

Referring to FIG. 13, the facial feature extracting apparatus 1300 includes a landmark extractor 1310, a probabilistic model generator 1320, a facial component extractor 1330, and a facial feature extractor 1340.

The landmark extractor 1310 may extract facial landmarks from an input image including a face region. In an example, the landmark extractor 1310 may detect the face region in the input image including the face region, and extract facial landmarks of facial components from the detected face region. For example, the landmark extractor 1310 may extract the facial landmarks from the detected face region using an ACM, an ASM, an AAM, or an SDM.

In another example, the landmark extractor 1310 may perform a preprocessing operation such as, for example, background removal and luminance correction, on the input image and then extract the facial landmarks from the input image on which the preprocessing operation is performed.

The probabilistic model generator 1320 may generate a probabilistic model associated with a skin region and a facial component region based on the facial landmarks. The probabilistic model generator 1320 may calculate a probability of each pixel included in the face region that the pixel corresponds to the skin region or the facial component region. The probabilistic model generator 1320 may generate the probabilistic model by learning a likelihood model associated with color pixel values of pixels included in the skin region and the facial component region based on location information of the facial landmarks. The probabilistic model generator 1320 may determine a sampling region in the face region based on the facial landmarks. The probabilistic model generator 1320 may generate the probabilistic model associated with the skin region and the facial component region based on pixel values of pixels included in the sampling region.

The facial component extractor 1330 may extract a facial component region from the face region using the probabilistic model associated with the skin region and the facial component region. The facial component extractor 1330 may extract, as the facial component region, a region having a lower probability of corresponding to a skin tone from the face region using the probabilistic model. The facial component extractor 1330 may classify the face region into the skin region and the facial component region by applying pixel values of pixels included in the face region to the probabilistic model. The facial component extractor 1330 may generate a skin-excluded probability map and facial component masks for facial components based on a result of the classifying.

The facial feature extractor 1340 may extract facial feature information from the extracted facial component region.

The facial feature extractor 1340 may extract, from the extracted facial component region, contour-level facial feature information, region-level facial feature information, or pixel-level facial feature information.

The facial feature extractor 1340 may determine a contour of a facial component based on the facial component region, and sample a plurality of points on the determined contour of the facial component. The facial feature extractor 1340 may determine multilevel contour point sets from the sampled points, and extract the contour-level facial feature information such as a chord angle descriptor matrix based on each contour point set.

The facial feature extractor 1340 may determine a feature extraction region associated with an eyebrow, an eye, a lip, and the like from the input image using the skin-excluded probability map or the facial component masks. The facial feature extractor 1340 may extract the region-level facial feature information for the determined feature extraction region using a polar model shape. The facial feature extractor 1340 may determine a polar shape matrix associated with the facial component region by applying the polar model shape to the facial component region.

The facial feature extractor 1340 may extract an image feature through which a detailed change in a shape may be distinguished by applying an existing pixel-level feature extracting method, for example, an LBP, a SIFT, a HoG, and an MCT, to a probability value determined through the probabilistic model. The facial feature extractor 1340 may determine the feature extraction region associated with the eyebrow, the eye, the lip, and the like from the input image using the skin-excluded probability map or the facial component masks, and extract the facial feature information by applying the feature extracting method such as the LBP, the SIFT, the HoG, and the MCT to probability values of the skin-excluded probability map corresponding to the determined feature extraction region.

The units and/or modules described herein (i.e., the facial feature extracting apparatus 100, the facial feature extracting apparatus 1300, the landmark extractor 1310, the probabilistic model generator 1320, the facial component extractor 1330 and the facial feature extractor 1340) may be implemented using hardware components and/or hardware components executing software components to operate as special purpose computing devices to perform the functions thereof. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of extracting a facial feature, the method comprising:
   extracting facial landmarks from an input image, the input image including a face region;
   generating a probabilistic model associated with a skin region based on the extracted facial landmarks, the generating the probabilistic model including,
   determining a skin color probability distribution of the input image,
   determining at least two facial component color probability distributions of the input image, and
   generating the probabilistic model based on the skin color probability distribution and the at least two facial component color probability distributions;

extracting a facial component region from the face region using the probabilistic model, the extracting including,
generating at least one of a skin-excluded probability map for the facial component region and a facial component mask indicating the facial component region based on a result of a comparison between a probability that a current pixel of the input image is a part of the facial component region and a probability that the current pixel is a part of the skin region; and
extracting facial feature information from the extracted facial component region.

2. The method of claim 1, wherein the extracting the facial feature information comprises:
determining a contour of a facial component based on the extracted facial component region;
sampling a plurality of points on the contour of the facial component;
determining multilevel contour point sets from the sampled points, a first point set of the multilevel contour point sets having a fewer number of points than a second point set of the multilevel contour point sets; and
extracting the facial feature information based on each multilevel contour point set.

3. The method of claim 1, wherein the extracting the facial component region comprises:
classifying the face region into the skin region and the facial component region by applying pixel values of pixels in the face region to the probabilistic model; and
the generating generates the at least one of the skin-excluded probability map and the facial component mask indicating the facial component region based on the classifying.

4. The method of claim 3, wherein the extracting the facial feature information comprises:
extracting a contour-level facial feature from the extracted facial component region using the generated at least one of the skin-excluded probability map and the facial component mask.

5. The method of claim 1, wherein the generating the probabilistic model associated with the skin region comprises:
determining a sampling region for the skin region based on the facial landmarks, the skin region being in the face region; and
generating the probabilistic model associated with the skin region by learning a likelihood associated with the skin region based on pixel values of pixels in the sampling region.

6. The method of claim 1, wherein the generating the probabilistic model associated with the skin region comprises:
determining a sampling region for the facial component region in the face region based on the facial landmarks; and
generating a probabilistic model associated with the facial component region by learning a likelihood associated with the facial component region based on pixel values of pixels in the sampling region.

7. The method of claim 1, wherein the extracting the facial feature information comprises:
extracting, from the extracted facial component region, at least one of a contour-level facial feature, a region-level facial feature, and a pixel-level facial feature.

8. The method of claim 1, wherein the extracting the facial feature information comprises:

extracting a chord angle descriptor matrix from the extracted facial component region by classifying an angle between points forming a shape of the extracted facial component region.

9. The method of claim 1, wherein the extracting the facial feature information comprises:
identifying probability values of pixels in the extracted facial component region based on the probabilistic model, and extracting pixel-level information of the facial feature information based on the identified probability values of the pixels.

10. The method of claim 1, wherein the extracting the facial feature information comprises:
determining a polar shape matrix associated with the extracted facial component region by applying a polar model shape to the extracted facial component region, the polar model shape being based on a center of gravity (CoG) of the extracted facial component region.

11. A method of recognizing a face, the method comprising:
extracting facial landmarks from an input image, the input image including a face region;
generating a probabilistic model associated with a skin region and a facial component region based on the extracted facial landmarks, the generating the probabilistic model including,
determining a skin color probability distribution of the input image,
determining at least two facial component color probability distributions of the input image, and
generating the probabilistic model based on the skin color probability distribution and the at least two facial component color probability distributions;
extracting facial feature information regarding the facial component region based on the probabilistic model, the extracting including,
generating at least one of a skin-excluded probability map for the facial component region and a facial component mask indicating the facial component region based on a result of a comparison between a probability that a current pixel of the input image is a part of the facial component region and a probability that the current pixel is a part of in the skin region; and
recognizing a face in the input image based on the extracted facial feature information.

12. The method of claim 11, wherein the extracting the facial feature information comprises:
extracting the facial component region from the face region using the probabilistic model; and
extracting, from the extracted facial component region, at least one of a contour-level facial feature, a region-level facial feature, and a pixel-level facial feature.

13. The method of claim 12, wherein the extracting the facial feature information comprises:
determining a contour of a facial component based on the extracted facial component region;
sampling a plurality of points on the contour of the facial component;
determining multilevel contour point sets from the sampled points, a first point set of the multilevel contour point sets having a fewer number of points than a second point set of the multilevel contour point sets; and
extracting the facial feature information based on each multilevel contour point set.

14. The method of claim 11, wherein the extracting the facial component region comprises:
classifying the face region into the skin region and the facial component region by applying pixel values of pixels in the face region to the probabilistic model; and
the generating generates the at least one of the skin-excluded probability map and the facial component mask indicating the facial component region based on the classifying.

15. A non-transitory computer-readable medium comprising program code that, when executed by a processor, performs the method of claim 1.

16. An apparatus for extracting a facial feature, the apparatus comprising:
a memory storing computer-readable instructions; and
at least one processor configured to execute the computer-readable instructions to,
extract facial landmarks from an input image, the input image including a face region,
determine a skin color probability distribution of the input image,
determine at least two facial component color probability distributions of the input image,
generate a probabilistic model associated with a skin region based on the extracted facial landmarks, the skin color probability distribution and the at least two facial component color probability distribution,
extract a facial component region from the face region using the probabilistic model,
generate at least one of a skin-excluded probability map for the facial component region and a facial component mask indicating the facial component region based on a result of a comparison between a probability that a current pixel of the input image is a part of the facial component region and a probability that the current pixel is a part of the skin region, and
extract facial feature information from the extracted facial component region.

17. The apparatus of claim 16, wherein the at least one processor is configured to execute the computer-readable instructions to determine a contour of a facial component based on the extracted facial component region and extract a facial feature based on points sampled on the contour of the facial component.

18. The apparatus of claim 16, wherein the at least one processor is configured to execute the computer-readable instructions to classify the face region into the skin region and the facial component region by applying pixel values of pixels in the face region to the probabilistic model, and generate the at least one of the skin-excluded probability map and the facial component mask indicating the facial component region based on the classifying.

19. The apparatus of claim 16, wherein the at least one processor is configured to execute the computer-readable instructions to determine a sampling region in the face region based on the facial landmarks, and generate the probabilistic model region based on pixel values of pixels in the sampling region.

* * * * *